(12) United States Patent
Shigeta

(10) Patent No.: US 9,555,613 B2
(45) Date of Patent: Jan. 31, 2017

(54) FULLY AUTOMATIC GRAVURE PREPARATION PROCESSING SYSTEM

(75) Inventor: Tatsuo Shigeta, Chiba (JP)

(73) Assignee: THINK LABORATORY CO., LTD., Chiba (JP)

(*) Notice: Subject to any disclaimer, the term of this patent is extended or adjusted under 35 U.S.C. 154(b) by 739 days.

(21) Appl. No.: 13/575,489

(22) PCT Filed: Apr. 1, 2011

(86) PCT No.: PCT/JP2011/058398
§ 371 (c)(1),
(2), (4) Date: Jul. 26, 2012

(87) PCT Pub. No.: WO2011/125926
PCT Pub. Date: Oct. 13, 2011

(65) Prior Publication Data
US 2012/0308347 A1 Dec. 6, 2012

(30) Foreign Application Priority Data
Apr. 6, 2010 (JP) .................................. 2010-087517

(51) Int. Cl.
*B25J 21/00* (2006.01)
*B41C 1/18* (2006.01)
*B41C 1/02* (2006.01)

(52) U.S. Cl.
CPC ............... *B41C 1/18* (2013.01); *B25J 21/005* (2013.01); *B41C 1/025* (2013.01)

(58) Field of Classification Search
CPC .... B25J 21/005; B23Q 39/046; B23Q 7/1494; B05C 15/00; G03F 7/18; B05B 15/1288; B05B 15/1207

(Continued)

(56) References Cited

U.S. PATENT DOCUMENTS

2002/0114685 A1* 8/2002 Inui ...................... B65G 1/0435
                                                                414/281
2005/0059538 A1    3/2005 Murai et al.
2005/0100826 A1*   5/2005 Sato et al. .................... 430/307

FOREIGN PATENT DOCUMENTS

EP      1 449 649 A2    8/2004
EP      1 642 713 A1    4/2006
(Continued)

OTHER PUBLICATIONS

Aoyin, pp. 269-274, ISBN 7-800005534.

*Primary Examiner* — Gerald McClain
(74) *Attorney, Agent, or Firm* — McGlew and Tuttle, P.C.

(57) ABSTRACT

A fully automatic gravure preparation processing system having high degrees of freedom, which is capable of manufacturing a gravure printing roll more quickly as compared to a conventional case, achieving space saving, performing an unattended operation even in the nighttime, flexibly customizing a manufacturing line, and satisfying various customer needs. The fully automatic gravure preparation processing system includes a processing room-A having a handling area of a first industrial robot for chucking and handling a roll to be prepared and a processing room-B having a handling area of a second industrial robot for chucking and handling the roll to be prepared. The first industrial robot and the second industrial robot are configured to transfer the roll to be prepared therebetween when preparation processing is performed.

18 Claims, 1 Drawing Sheet

(58) Field of Classification Search
USPC .................................................. 414/222.07
See application file for complete search history.

(56) References Cited

FOREIGN PATENT DOCUMENTS

| | | | |
|---|---|---|---|
| JP | 10-193551 A | | 7/1998 |
| JP | 2004-223751 A | | 8/2004 |
| JP | 2004-225111 A | | 8/2004 |
| JP | 2004-232028 A | | 8/2004 |
| JP | 2005-46917 A | | 2/2005 |
| JP | 2006-15279 A | | 1/2006 |
| JP | 2006015279 A | * | 1/2006 |
| JP | 2007-90447 A | | 4/2007 |
| JP | 2008-221589 A | | 9/2008 |
| JP | 2009-93171 A | | 4/2009 |
| WO | 2007/135898 | | 11/2007 |
| WO | 2007/135899 | | 11/2007 |
| WO | WO 2007135899 A1 | * | 11/2007 |

* cited by examiner

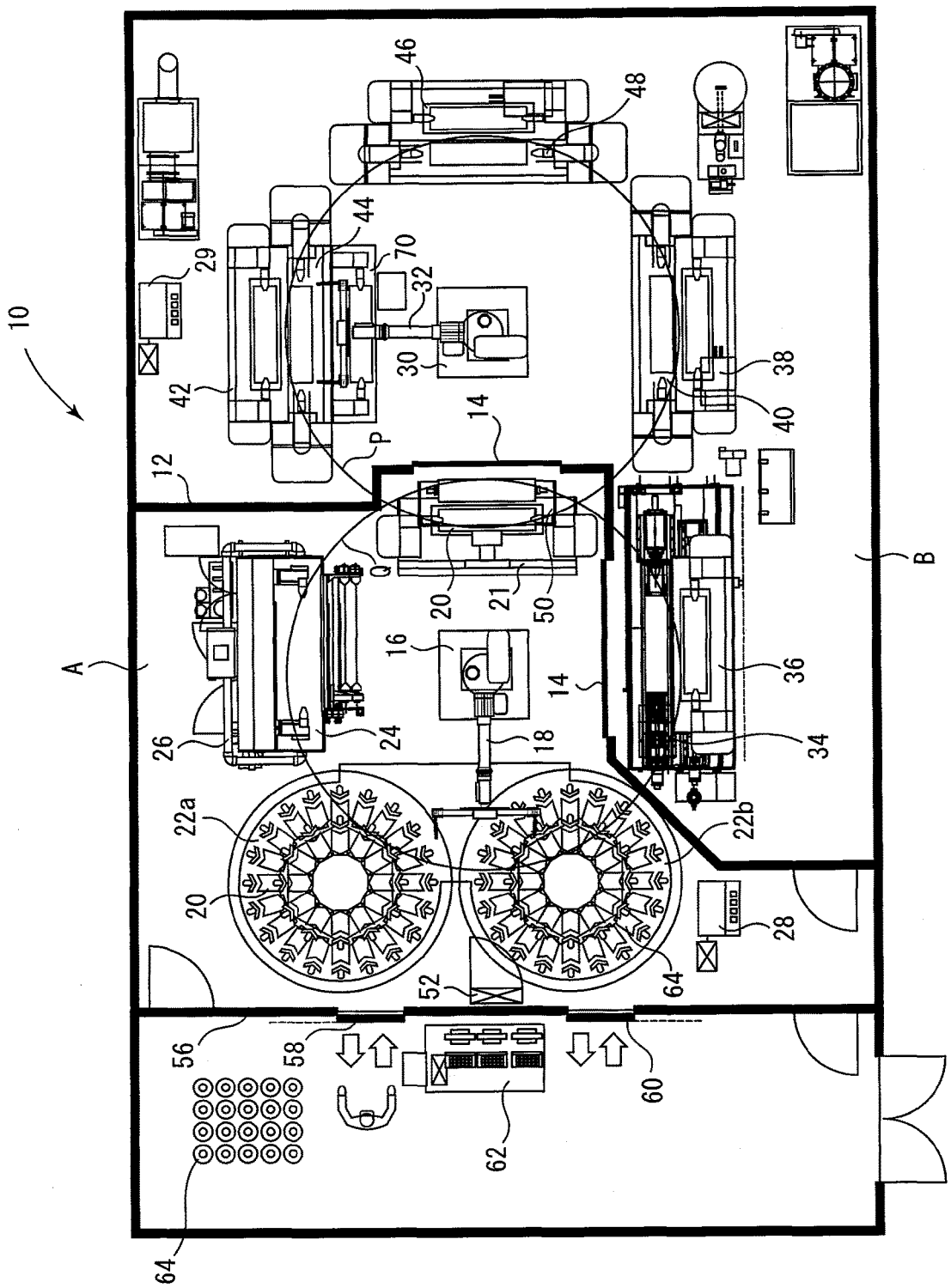

FULLY AUTOMATIC GRAVURE PREPARATION PROCESSING SYSTEM

TECHNICAL FIELD

The present invention relates to a gravure preparation processing system, and more particularly, to a fully automatic gravure preparation processing system capable of performing an unattended operation even in the nighttime.

BACKGROUND ART

Conventionally, gravure preparation plants described in Patent Documents 1 to 6 have been known.

As can be seen from the drawings of Patent Documents 1 to 3, a manufacturing line for a gravure printing roll has conventionally been constructed of an industrial robot and a stacker crane used in combination.

In the manufacturing line using the stacker crane, processing is performed in each of various processing units under a state in which a roll to be prepared is chucked at the stacker crane with use of a cassette-type roll chuck rotary transportation unit.

However, in the case of such a manufacturing line using the stacker crane, the roll to be prepared is sequentially transferred to the various processing units under the state in which the roll to be prepared is chucked with use of the cassette-type roll chuck rotary transportation unit, and hence there arises a problem in that a longer time period is required accordingly.

Further, in recent years, there have been customer needs for more flexible customization of the manufacturing line.

PRIOR ART DOCUMENTS

Patent Documents

Patent Document 1: JP 10-193551 A
Patent Document 2: WO 2007/135898
Patent Document 3: WO 2007/135899
Patent Document 4: JP 2004-223751 A
Patent Document 5: JP 2004-225111 A
Patent Document 6: JP 2004-232028 A
Patent Document 7: JP 2008-221589 A

SUMMARY OF INVENTION

Technical Problem

The present invention has been made in view of the above-mentioned circumstances of the conventional technologies, and it is therefore an object thereof to provide a fully automatic gravure preparation processing system having high degrees of freedom, which is capable of manufacturing a gravure printing roll more quickly as compared to a conventional case, achieving space saving, performing an unattended operation even in the nighttime, flexibly customizing a manufacturing line, and satisfying various customer needs.

In order to achieve the above-mentioned object, a fully automatic gravure preparation processing system according to the present invention includes: a processing room-A having a handling area of a first industrial robot for chucking and handling a roll to be prepared; a processing room-B having a handling area of a second industrial robot for chucking and handling the roll to be prepared, the processing room-A and the processing room-B being communicable to each other; at least one processing apparatus arranged within the handling area of the first industrial robot of the processing room-A, the at least one processing apparatus being selected from among a roll stock apparatus, a photosensitive film coating apparatus, an electronic engraving apparatus, a laser exposure latent image forming apparatus, a degreasing apparatus, a grinding wheel polishing apparatus, an ultrasonic cleaning apparatus, a copper plating apparatus, a surface hardening film forming apparatus, a developing apparatus, an etching apparatus, a resist image removal apparatus, and a paper polishing apparatus; and at least one processing apparatus arranged within the handling area of the second industrial robot of the processing room-B, the at least one processing apparatus being excluded in the arrangement of the processing room-A, the at least one processing apparatus of the processing room-A and the at least one processing apparatus of the processing room-B being installable and dismantlable. The first industrial robot and the second industrial robot are configured to transfer the roll to be prepared therebetween when preparation processing is performed.

In this manner, the roll to be prepared is transferred between the first industrial robot and the second industrial robot, and thus the gravure printing roll can be manufactured more quickly as compared to the conventional manufacturing line for a gravure printing roll using a stacker crane. Further, the roll to be prepared is transferred between the first industrial robot and the second industrial robot, and hence the stacker crane becomes unnecessary, which leads to such an advantage that space saving can be achieved. Further, the series of processing can be performed fully automatically based on predetermined programs, and hence there is also such an advantage that an unattended operation can be performed even in the nighttime.

Further, the processing apparatus can be installed and dismantled within the handling areas. Accordingly, through replacement and arrangement performed by installing or dismantling the processing apparatus, the manufacturing line can be customized flexibly and various customer needs can be satisfied. Thus, the fully automatic gravure preparation processing system has high degrees of freedom. Conventionally, the stacker crane has been installed, and hence there is a limit to the location of the manufacturing line and the installation places of the processing apparatus. In contrast, according to the present invention, the processing apparatus only need to be installed within the handling areas of the first industrial robot and the second industrial robot, and hence there is such an advantage that the manufacturing line can be customized flexibly in response to the customer demands.

Further, it is preferred that: the processing room-A be arranged as a clean room; the processing room-A be provided with a roll entrance; the roll stock apparatus be arranged in the vicinity of the roll entrance so as to stock the roll to be prepared; the roll stock apparatus, the photosensitive film coating apparatus, the laser exposure latent image forming apparatus, the grinding wheel polishing apparatus, and the paper polishing apparatus be arranged within the handling area of the first industrial robot of the processing room-A; the degreasing apparatus, the ultrasonic cleaning apparatus, the copper plating apparatus, the surface hardening film forming apparatus, the developing apparatus, the etching apparatus, and the resist image removal apparatus be arranged within the handling area of the second industrial robot of the processing room-B; the processing room-A or the processing room-B include a roll transfer placement table; and the first industrial robot and the second industrial robot be configured to transfer the roll to be prepared therebetween via the roll transfer placement table when the preparation processing is performed.

It is preferred that the surface hardening film forming apparatus be a chromium plating apparatus, a DLC film forming apparatus, or a silicon dioxide film forming apparatus. For example, the diamond-like carbon (DLC) film forming apparatus for forming a DLC film as described in Patent Document 2, the silicon dioxide film forming apparatus for forming a silicon dioxide film as described in Patent Document 3, or the chromium plating apparatus as described in Patent Document 1 is applicable.

Advantageous Effects of Invention

The present invention produces a remarkable effect that it becomes possible to provide a fully automatic gravure preparation processing system having high degrees of freedom, which is capable of manufacturing a gravure printing roll more quickly as compared to a conventional case, achieving space saving, performing an unattended operation even in the nighttime, flexibly customizing a manufacturing line, and satisfying various customer needs.

BRIEF DESCRIPTION OF DRAWINGS

FIG. 1 A schematic plan view illustrating a fully automatic gravure preparation processing system according to an embodiment of the present invention.

DESCRIPTION OF EMBODIMENTS

Embodiments of the present invention are described below, but those embodiments are described as examples, and hence it is understood that various modifications may be made thereto without departing from the technical spirit of the present invention.

A fully automatic gravure preparation processing system for a gravure printing roll according to the present invention is described with reference to the accompanying drawing. In FIG. 1, reference symbol 10 represents the fully automatic gravure preparation processing system for a gravure printing roll according to the present invention. The fully automatic gravure preparation processing system 10 includes a processing room-A and a processing room-B. The processing room-A and the processing room-B are partitioned by a wall 12, and are communicable to each other via an openable and closable shutter 14.

A configuration of the processing room-A is described. In the processing room-A, reference symbol 16 represents a first industrial robot, which includes a turnable multi-axis robotic arm 18. The first industrial robot 16 is controlled by operating a control panel 28. Reference symbol Q represents a turnable range of the robotic arm 18, which corresponds to a handling area of the first industrial robot 16.

Reference symbol 20 represents a roll to be prepared, and reference symbols 22a and 22b represent roll stock apparatus, respectively. As the roll stock apparatus, for example, the roll stock apparatus disclosed in Patent Documents 4 to 6 may be used.

Reference symbol 24 represents a photosensitive film coating apparatus, and reference symbol 26 represents a laser exposure apparatus. In the example of FIG. 1, the photosensitive film coating apparatus 24 is provided above the laser exposure apparatus 26. As those apparatus, conventionally known apparatus are applicable, and for example, the photosensitive film coating apparatus and the laser exposure apparatus as disclosed in Patent Documents 4 to 6 may be used. Reference symbol 50 represents a roll transfer placement table, on which the roll 20 to be prepared is placeable for transfer. Below the roll transfer placement table 50, a paper polishing apparatus 21 is provided so as to perform paper polishing. As the paper polishing apparatus 21, for example, the paper polishing apparatus as disclosed in Patent Documents 4 to 6 may be used. Further, in the processing room-A, a main control panel 52 is provided so as to control the fully automatic gravure preparation processing system 10.

In the example of FIG. 1, there is described a case where the photosensitive film coating apparatus 24 is installed and the laser exposure apparatus 26 performs laser exposure, but there may be employed a method in which an electronic engraving apparatus is installed so as to perform electronic engraving. As the electronic engraving apparatus, a conventionally known apparatus is applicable, and for example, the electronic engraving apparatus as disclosed in Patent Documents 4 to 6 may be used.

Next, a configuration of the processing room-B is described. In the processing room-B, reference symbol 30 represents a second industrial robot, which includes a turnable multi-axis robotic arm 32. The second industrial robot 30 is controlled by operating a control panel 29. Reference symbol P represents a turnable range of the robotic arm 32, which corresponds to a handling area of the second industrial robot 30.

Reference symbol 34 represents a grinding wheel polishing apparatus, and reference symbol 36 represents an ultrasonic cleaning apparatus. As the grinding wheel polishing apparatus 34, a conventionally known apparatus is applicable, and for example, the grinding wheel polishing apparatus as disclosed in Patent Documents 4 to 6 may be used. Further, the ultrasonic cleaning apparatus 36 includes a reservoir for storing cleaning water, and an ultrasonic transducer provided below the reservoir. The ultrasonic cleaning apparatus 36 is capable of performing cleaning by vibrating the cleaning water through ultrasonic vibration of the ultrasonic transducer.

Reference symbol 38 represents a degreasing apparatus, and reference symbol 40 represents a copper plating apparatus. As those apparatus, conventionally known apparatus are applicable, and for example, the degreasing apparatus and the copper plating apparatus as disclosed in Patent Documents 4 to 6 may be used.

Reference symbol 42 represents a developing apparatus, and reference symbol 44 represents an etching apparatus. As those apparatus, conventionally known apparatus are applicable, and for example, the developing apparatus and the etching apparatus as disclosed in Patent Documents 4 to 6 may be used.

Reference symbol 46 represents a resist removal apparatus, and reference symbol 48 represents a chromium plating apparatus. As the resist removal apparatus, a conventionally known apparatus is applicable, and for example, the resist removal apparatus as disclosed in Patent Documents 4 to 6 may be used. As the chromium plating apparatus, a conventionally known apparatus may be used, and for example, the chromium plating apparatus as disclosed in Patent Document 1 may be used. Further, in the example of FIG. 1, the chromium plating apparatus is used as an example of a surface hardening film forming apparatus, but alternatively, a DLC film forming apparatus or a silicon dioxide film forming apparatus is applicable as the surface hardening film forming apparatus. As the DLC film forming apparatus, for example, the DLC film forming apparatus as described in Patent Document 2 may be used, and as the silicon dioxide film forming apparatus, for example, the silicon dioxide film forming apparatus as described in Patent Document 3 may be used.

Reference symbol 70 represents a washing and drying apparatus, which is configured to perform washing and drying for each processing as necessary.

In the example of FIG. 1, the processing room-A is arranged as a clean room. The processing room-A and the processing room-B may be arranged as clean rooms, respectively, as necessary.

Doors 58 and 60 are provided on a wall 56 of the processing room-A, through which a prepared roll is carried outside and a roll to be prepared (printing base material) is newly carried inside. The prepared roll is placed on any one of the roll stock apparatus 22a and 22b, and the roll to be prepared is placed on the other roll stock apparatus. A computer 62 is installed outside the processing room-A so as to check and manage various kinds of information, perform settings for various kinds of programs, and perform other operations. Reference symbol 64 represents a prepared roll that is manufactured.

Referring to FIG. 1, actions of the fully automatic gravure preparation processing system according to the present invention are described. The first industrial robot 16 chucks the roll 20 to be prepared, which is placed on any one of the roll stock apparatus 22a and 22b, and places the roll 20 to be prepared on the roll transfer placement table 50 so that the roll 20 to be prepared is transferred to the second industrial robot 30. The second industrial robot 30 chucks the roll 20 to be prepared, and transports the roll 20 to be prepared to the degreasing apparatus 38. Then, the second industrial robot 30 releases the roll 20 to be prepared, and sets the roll 20 to be prepared onto the degreasing apparatus 38.

When a degreasing work is finished at the degreasing apparatus 38, the second industrial robot 30 chucks the roll 20 to be prepared, and transports the roll 20 to be prepared to the copper plating apparatus 40. Then, the second industrial robot 30 releases the roll 20 to be prepared, and sets the roll 20 to be prepared onto the copper plating apparatus 40.

When a plating work is finished at the copper plating apparatus 40, the second industrial robot 30 chucks the roll 20 to be prepared, and transports and places the roll 20 to be prepared onto the roll transfer placement table 50 so that the roll 20 to be prepared is transferred to the first industrial robot 16. The first industrial robot 16 chucks the roll 20 to be prepared, and transports the roll 20 to be prepared to the grinding wheel polishing apparatus 34. Then, the first industrial robot 16 releases the roll 20 to be prepared, and sets the roll 20 to be prepared onto the grinding wheel polishing apparatus 34.

When a grinding wheel polishing work is finished at the grinding wheel polishing apparatus 34, the first industrial robot 16 chucks the roll 20 to be prepared, and transports the roll 20 to be prepared to the ultrasonic cleaning apparatus 36. Then, the first industrial robot 16 releases the roll 20 to be prepared, and sets the roll 20 to be prepared onto the ultrasonic cleaning apparatus 36.

When an ultrasonic cleaning work is finished at the ultrasonic cleaning apparatus 36, the first industrial robot 16 chucks the roll 20 to be prepared, and transports the roll 20 to be prepared to the photosensitive film coating apparatus 24. Then, the first industrial robot 16 releases the roll 20 to be prepared, and sets the roll 20 to be prepared onto the photosensitive film coating apparatus 24.

When a photosensitive film coating work is finished at the photosensitive film coating apparatus 24, the first industrial robot 16 chucks the roll 20 to be prepared, and transports the roll 20 to be prepared to the laser exposure apparatus 26. Then, the first industrial robot 16 releases the roll 20 to be prepared, and sets the roll 20 to be prepared onto the laser exposure apparatus 26.

When a laser exposure work is finished at the laser exposure apparatus 26, the first industrial robot 16 chucks the roll 20 to be prepared, and places the roll 20 to be prepared onto the roll transfer placement table 50 so that the roll 20 to be prepared is transferred to the second industrial robot 30. The second industrial robot 30 chucks the roll 20 to be prepared, and transports the roll 20 to be prepared to the developing apparatus 42. Then, the second industrial robot 30 releases the roll 20 to be prepared, and sets the roll 20 to be prepared onto the developing apparatus 42.

When a developing work is finished at the developing apparatus 42, the second industrial robot 30 chucks the roll 20 to be prepared, and transports the roll 20 to be prepared to the etching apparatus 44. Then, the second industrial robot 30 releases the roll 20 to be prepared, and sets the roll 20 to be prepared onto the etching apparatus 44.

When an etching work is finished at the etching apparatus 44, the second industrial robot 30 chucks the roll 20 to be prepared, and transports the roll 20 to be prepared to the resist removal apparatus 46. Then, the second industrial robot 30 releases the roll 20 to be prepared, and sets the roll 20 to be prepared onto the resist removal apparatus 46.

When a resist removal work is finished at the resist removal apparatus 46, the second industrial robot 30 chucks the roll 20 to be prepared, and transports the roll 20 to be prepared to the chromium plating apparatus 48. Then, the second industrial robot 30 releases the roll 20 to be prepared, and sets the roll 20 to be prepared onto the chromium plating apparatus 48. Then, chromium plating is performed at the chromium plating apparatus 48. Note that, the roll 20 to be prepared is washed and dried for each processing at the washing and drying apparatus 70.

When a plating work is finished at the chromium plating apparatus 48, the second industrial robot 30 chucks the roll 20 to be prepared, and transports the roll 20 to be prepared to the paper polishing apparatus 21. Then, the second industrial robot 30 releases the roll 20 to be prepared, and sets the roll 20 to be prepared onto the paper polishing apparatus 21. When paper polishing (automatic polishing) is performed at the paper polishing apparatus 21, the prepared roll 64 is obtained and, in the example of FIG. 1, placed on the roll stock apparatus 22b.

The prepared roll 64 thus obtained is carried outside the processing room-A as a final product.

Note that, the above-mentioned actions are an example of the fully automatic gravure preparation processing system according to the present invention, and the manufacturing line can be customized flexibly in response to customer needs so as to be constructed as a preparation line of various arrangements.

In the example of FIG. 1, as each of the first industrial robot 16 and the second industrial robot 30, the industrial robot as disclosed in Patent Documents 1 to 6 is used for transporting the roll 20 to be prepared to each processing apparatus, and releasing and setting the roll 20 to be prepared onto the processing apparatus. Then, the roll to be prepared is rotated by drive means provided in the processing apparatus.

On the other hand, there may be employed the following configuration. That is, as each of the first industrial robot and the second industrial robot, the industrial robot including drive means as disclosed in Patent Document 7 is used for transporting the roll 20 to be prepared to each processing apparatus, and setting the roll 20 to be prepared onto the processing apparatus while gripping the roll 20 to be prepared. Then, the roll to be prepared is rotated by the drive means provided in the industrial robot.

REFERENCE SIGNS LIST

10: fully automatic gravure preparation processing system, 12: wall, 14: shutter, 16: first industrial robot, 18, 32: robotic arm, 20: roll to be prepared, 21: paper polishing apparatus, 22a, 22b: roll stock apparatus, 24: photosensitive film coating apparatus, 26: laser exposure apparatus, 28, 29: control panel, 30: second industrial robot, 34: grinding wheel polishing apparatus, 36: ultrasonic cleaning apparatus, 38: degreasing apparatus, 40: copper plating apparatus, 42: developing apparatus, 44: etching apparatus, 46: resist removal apparatus, 48: chromium plating apparatus, 50: roll transfer placement table, 52: main control panel, 56: wall, 58, 60: door, 62: computer, 64: prepared roll, 70: washing and drying apparatus, A: processing room, B: processing room, P, Q: turnable range.

The invention claimed is:

1. A fully automatic gravure preparation processing system, in which a roll to be prepared is transferred by using industrial robots only, the system comprising:
   a first processing room comprising a first industrial robot handling area of a first industrial robot for chucking and handling a roll to be prepared;
   a second processing room comprising a second industrial robot handling area of a second industrial robot for chucking and handling the roll to be prepared, the first processing room and the second processing room being communicable to each other, at least one processing apparatus being arranged within the first industrial robot handling area of the first industrial robot of the first processing room, the at least one processing apparatus comprising at least one of a roll stock apparatus, a photosensitive film coating apparatus, an electronic engraving apparatus, a laser exposure latent image forming apparatus, a degreasing apparatus, a grinding wheel polishing apparatus, an ultrasonic cleaning apparatus, a copper plating apparatus, a surface hardening film forming apparatus, a developing apparatus, an etching apparatus, a resist image removal apparatus and a paper polishing apparatus, at least another processing apparatus being arranged within the second industrial robot handling area of the second industrial robot of the second processing room, the at least another processing apparatus being excluded in an arrangement of the first processing room, the at least one processing apparatus of the first processing room and the at least another processing apparatus of the second processing room being installable and dismantlable, wherein the first industrial robot and the second industrial robot are configured to transfer the roll to be prepared therebetween when preparation processing is performed, wherein the roll be prepared is transferred without using a stacker crane, wherein said first industrial robot handling area is defined by movement of a robotic arm of said first industrial robot, said second industrial robot handling area being defined by movement of a robotic arm of said second industrial robot, wherein at least a portion of said first industrial robot handling area overlaps with at least a portion of said second industrial robot handling area.

2. A fully automatic gravure preparation processing system according to claim 1, wherein:
   the first processing room is arranged as a clean room;
   the first processing room comprises a roll entrance;
   the roll stock apparatus is arranged in an area of the roll entrance so as to stock the roll to be prepared;
   the roll stock apparatus, the photosensitive film coating apparatus, the laser exposure latent image forming apparatus, the grinding wheel polishing apparatus, and the paper polishing apparatus are arranged within the first industrial robot handling area of the first industrial robot of the first processing room;
   the degreasing apparatus, the ultrasonic cleaning apparatus, the copper plating apparatus, the surface hardening film forming apparatus, the developing apparatus, the etching apparatus, and the resist image removal apparatus are arranged within the second industrial robot handling area of the second industrial robot of the second processing room;
   the first processing room or the second processing room comprises a roll transfer placement table; and
   the first industrial robot and the second industrial robot are configured to transfer the roll to be prepared therebetween via the roll transfer placement table when the preparation processing is performed, wherein the stacker crane is not provided between the first industrial robot and the second industrial robot such that the roll to be prepared is transferred from a position in a handling area of the first industrial robot directly to a position in a handling area of the second industrial robot.

3. A fully automatic gravure preparation processing system according to claim 2, wherein the surface hardening film forming apparatus comprises a chromium plating apparatus, a DLC film forming apparatus, or a silicon dioxide film forming apparatus.

4. A fully automatic gravure preparation processing system according to claim 1, wherein the surface hardening film forming apparatus comprises a chromium plating apparatus, a DLC film forming apparatus, or a silicon dioxide film forming apparatus, wherein a handling area of the first industrial robot intersects with a handling area of the second industrial robot, said first industrial robot comprising a first industrial robot arm, wherein an extent of said first industrial robot arm defines said handling area of the first industrial robot, said second industrial robot comprising a second industrial robot arm, wherein an extent of said second industrial robot arm defines said handling area of the second industrial robot.

5. A fully automatic gravure preparation processing system according to claim 1, wherein the first processing room is arranged as a clean room, the first processing room or the second processing room comprising a roll transfer placement table, the first industrial robot and the second industrial robot being configured to transfer the roll to be prepared therebetween via the same roll transfer placement table when the preparation processing is performed.

6. A fully automatic gravure preparation processing system, the system comprising:
   a first processing room comprising a first industrial robot handling area of a first industrial robot for chucking and handling a roll to be prepared, said first industrial robot comprising a first industrial robot arm, said first industrial robot arm defining said first industrial robot handling area;
   a second processing room comprising a second industrial robot handling area of a second industrial robot for chucking and handling the roll to be prepared, said second industrial robot comprising a second industrial robot arm, said second industrial robot arm defining said second industrial robot handling area, the first processing room and the second processing room being communicable to each other, at least one processing apparatus being arranged within the first industrial robot handling area of the first industrial robot of the first processing room, the at least one processing apparatus comprising at least one of a roll stock apparatus, a photosensitive film coating apparatus, an electronic engraving apparatus, a laser exposure latent image forming apparatus, a degreasing apparatus, a grinding wheel polishing apparatus, an ultrasonic cleaning apparatus, a copper plating apparatus, a surface hardening film forming apparatus, a developing apparatus, an etching apparatus, a resist image removal apparatus and a paper polishing apparatus, at least another processing apparatus being arranged within the second industrial robot handling area of the second industrial robot of the second processing room, the at least another processing apparatus being excluded in an arrangement of the first processing room, the at least one processing apparatus of the first processing room and the at least another processing apparatus of the second processing room being installable and dismantlable, said first industrial robot handling area intersecting said second industrial robot handling area, wherein the roll to be prepared is transferred between said first industrial robot and said second industrial robot when preparation processing is performed, wherein the roll to be prepared is transferred between the first industrial robot and the second industrial robot without using a stacker crane, said first industrial robot handling area being defined by movement of a robotic arm of said first industrial robot, said second industrial robot handling area being defined by a robotic arm of said second industrial robot, wherein at least a portion of said first industrial robot handling area overlaps with at least a portion of said second industrial robot handling area.

7. A fully automatic gravure preparation processing system according to claim 6, wherein the surface hardening film forming apparatus comprises a chromium plating apparatus, a DLC film forming apparatus, or a silicon dioxide film forming apparatus, wherein a space provided between the first industrial robot and the second industrial robot is free of a stacker crane.

8. A fully automatic gravure preparation processing system according to claim 6, wherein:
the first processing room is arranged as a clean room;
the first processing room comprises a roll entrance;
the roll stock apparatus is arranged in an area of the roll entrance so as to stock the roll to be prepared;
the roll stock apparatus, the photosensitive film coating apparatus, the laser exposure latent image forming apparatus, the grinding wheel polishing apparatus, and the paper polishing apparatus are arranged within the first industrial robot handling area of the first industrial robot of the first processing room;
the degreasing apparatus, the ultrasonic cleaning apparatus, the copper plating apparatus, the surface hardening film forming apparatus, the developing apparatus, the etching apparatus, and the resist image removal apparatus are arranged within the second industrial robot handling area of the second industrial robot of the second processing room;
the first processing room or the second processing room comprises a roll transfer placement table; and
the first industrial robot and the second industrial robot are configured to transfer the roll to be prepared therebetween via the roll transfer placement table when the preparation processing is performed.

9. A fully automatic gravure preparation processing system according to claim 8, wherein the surface hardening film forming apparatus comprises a chromium plating apparatus, a DLC film forming apparatus, or a silicon dioxide film forming apparatus.

10. A fully automatic gravure preparation processing system according to claim 6, wherein the roll is transferred to the second industrial robot by the first industrial robot by the second industrial robot and the roll is transferred to the first industrial robot by the second industrial robot.

11. A fully automatic gravure preparation processing system according to claim 6, wherein the first processing room is arranged as a clean room, the first processing room or the second processing room comprising a roll transfer placement table, the first industrial robot and the second industrial robot being configured to transfer the roll to be prepared therebetween via the same roll transfer placement table when the preparation processing is performed.

12. A fully automatic gravure preparation processing system, the system comprising:
a first processing room comprising a first industrial robot handling area of a first industrial robot for chucking and handling a roll to be prepared;
a second processing room comprising a second industrial robot handling area of a second industrial robot for chucking and handling the roll to be prepared, the first processing room and the second processing room being communicable to each other, at least one processing apparatus being arranged within the first industrial robot handling area of the first industrial robot of the first processing room, the at least one processing apparatus comprising at least one of a roll stock apparatus, a photosensitive film coating apparatus, an electronic engraving apparatus, a laser exposure latent image forming apparatus, a degreasing apparatus, a grinding wheel polishing apparatus, an ultrasonic cleaning apparatus, a copper plating apparatus, a surface hardening film forming apparatus, a developing apparatus, an etching apparatus, a resist image removal apparatus and a paper polishing apparatus, at least another processing apparatus being arranged within the second industrial robot handling area of the second industrial robot of the second processing room, the at least another processing apparatus being excluded in an arrangement of the first processing room, the at least one processing apparatus of the first processing room and the at least another processing apparatus of the second processing room being installable and dismantlable, said first industrial robot handling area being at least adjacent to said second industrial robot handling area, wherein the roll to be prepared is transferred between said first industrial robot and said second industrial robot when preparation processing is performed, wherein the first processing room is arranged as a clean room, the first processing room or the second processing room comprising a roll transfer placement table, the first industrial robot and the second industrial robot being configured to transfer the roll to be prepared therebetween via the same roll transfer placement table when the preparation processing is performed.

13. A fully automatic gravure preparation processing system according to claim 12, wherein the surface hardening film forming apparatus comprises a chromium plating apparatus, a DLC film forming apparatus, or a silicon dioxide film forming apparatus, said first industrial robot handling area being defined by movement of a robotic arm of said first industrial robot, said second industrial robot handling area being defined by movement of a robotic arm of said second industrial robot.

14. A fully automatic gravure preparation processing system according to claim 12, wherein a portion of said first industrial robot handling area overlaps a portion of said second industrial robot handling area.

15. A fully automatic gravure preparation processing system according to claim 14, wherein a stacker crane is not provided between the first industrial robot and the second industrial robot.

16. A fully automatic gravure preparation processing system according to claim 15, wherein:
the first processing room is arranged as a clean room;
the first processing room comprises a roll entrance;
the roll stock apparatus is arranged in an area of the roll entrance so as to stock the roll to be prepared;
the roll stock apparatus, the photosensitive film coating apparatus, the laser exposure latent image forming apparatus, the grinding wheel polishing apparatus, and the paper polishing apparatus are arranged within the first industrial robot handling area of the first industrial robot of the first processing room;
the degreasing apparatus, the ultrasonic cleaning apparatus, the copper plating apparatus, the surface hardening film forming apparatus, the developing apparatus, the etching apparatus, and the resist image removal apparatus are arranged within the second industrial robot handling area of the second industrial robot of the second processing room;
the first processing room or the second processing room comprises a roll transfer placement table; and
the first industrial robot and the second industrial robot are configured to transfer the roll to be prepared therebetween via the roll transfer placement table when the preparation processing is performed.

17. A fully automatic gravure preparation processing system according to claim 16, wherein the surface hardening film forming apparatus comprises a chromium plating apparatus, a DLC film forming apparatus, or a silicon dioxide film forming apparatus.

18. A fully automatic gravure preparation processing system according to claim 12, wherein the roll is transferred to the second industrial robot by the first industrial robot without using a stacker crane and the roll is transferred to the first industrial robot by the second industrial robot without using the stacker crane.

* * * * *